United States Patent
Ray et al.

(10) Patent No.: US 7,454,420 B2
(45) Date of Patent: Nov. 18, 2008

(54) DATA SORTING METHOD AND SYSTEM

(75) Inventors: Robert S. Ray, Cary, NC (US); Scott A. Mebust, Durham, NC (US)

(73) Assignee: SAS Institute Inc., Cary, NC (US)

( * ) Notice: Subject to any disclaimer, the term of this patent is extended or adjusted under 35 U.S.C. 154(b) by 460 days.

(21) Appl. No.: 10/983,745

(22) Filed: Nov. 8, 2004

(65) Prior Publication Data

US 2006/0101086 A1    May 11, 2006

(51) Int. Cl.
*G06F 17/30* (2006.01)
(52) U.S. Cl. .................................. 707/7; 707/1; 707/8
(58) Field of Classification Search ...................... 707/7, 707/1, 8
See application file for complete search history.

(56) References Cited

U.S. PATENT DOCUMENTS

| | | | |
|---|---|---|---|
| 5,613,085 A | 3/1997 | Lee et al. | |
| 5,852,826 A * | 12/1998 | Graunke et al. | 707/7 |
| 6,105,024 A | 8/2000 | Graefe et al. | |
| 6,519,593 B1 | 2/2003 | Matias et al. | |
| 2002/0032683 A1* | 3/2002 | Namba | 707/7 |
| 2002/0065793 A1 | 5/2002 | Arakawa et al. | |
| 2002/0091691 A1* | 7/2002 | Sharp | 707/7 |
| 2002/0178160 A1* | 11/2002 | Meaden | 707/7 |

OTHER PUBLICATIONS

Pang, HweeHwa et al., "Memory-Adaptive External Sorting", Proceedings of the 19th VLDB Conference, Dublin, Ireland, 1993, pp. 618-629.
Knuth, Donald E., "The Art of Computer Programming", vol. 3/Sorting and Searching, Addison Wesley Longman, Inc.,, Reading, Massachusetts, 1998, pp. 320-390.
Horowitz, Ellis et al., "Fundamentals of Data Structures", Computer Science Press, Inc., Rockville, Maryland, 1976, pp. 388-409.

(Continued)

*Primary Examiner*—John Cottingham
*Assistant Examiner*—Noosha Arjomandi
(74) *Attorney, Agent, or Firm*—Jones Day

(57) ABSTRACT

In accordance with the teachings described herein, systems and methods are provided for data sorting. A method for use with one or more processing devices in order to merge sorted runs of data may include the steps of: defining a plurality of floating buffers; calculating a number of data blocks for each floating buffer; configuring the floating buffers to store the number of data blocks; and using the floating buffers to perform an external data sorting operation. A data sorting system may include one or more programs, and may be used with a plurality of floating buffers and a data storage device for storing a plurality of sorted runs of data blocks, each data block including a plurality of data records. The one or more programs in a data sorting system may be operable to calculate a number of data blocks for each floating buffer and configure the plurality of floating buffers to store the number of data blocks. In addition, the one or more programs in a data sorting system may be further operable to sort the plurality of data records into a single sorted output using the plurality of floating buffers.

11 Claims, 7 Drawing Sheets

OTHER PUBLICATIONS

Kwan, Sai Choi et al., "The I/O Performance of Multiway Mergesort and Tag Sort", IEEE Transactions on Computers, vol. c-34, No. 4, Apr. 1985, pp. 383-391.

Salzberg, Betty, "Merging Sorted Runs Using Large Main Memory", Acta Informatica 27, 1989, pp. 195-215.

Ruemmler, Chris et al., "An Introduction to Disk Drive Modeling", Computer, vol. 27, No. 3, Mar. 1994, pp. 17-28.

Estivill-Castro, Vladimir et al., "Foundations for Faster External Sorting (Extended Abstract)", Fourteenth Conference on the Foundations of Software Technology and Theoretical Computer Science, Springer-Verlag LNCS 880, Madrase, India, 1994, pp. 414-425.

Zheng, LuoQuan et al., "Speeding Up External Mergesort", IEEE Transactions on Knowledge and Data Engineering, vol. 8, No. 2, Apr. 1996, pp. 322-332.

Estivill-Castro, Vladimir, "Sorting and Order Statistics", Algorithms and Theory of Computation Handbook, Chapter 3, CRC Press LLC, 1999.

\* cited by examiner

| | | | |
|---|---|---|---|
| 320 — R-1 | 35-80 — 322 | | 421-430 |
| | 142-159 | | 445-452 |
| | 187-188 | | 490-492 |
| | 227-266 | | 520-553 |
| | 321-353 | | 577-645 |
| | 356-376 | | 678-739 |
| | 399-401 | | 758-786 |
| | 403-412 | | 835-855 |
| | 432-449 | | 874-933 |
| | 532-561 | R-4 | 21-40 |
| | 581-622 | | 90-136 |
| | 769-789 | | 155-199 |
| | 815-825 | | 203-207 |
| | 836-882 | | 215-251 |
| | 886-904 | | 256-330 |
| R-2 | 34-113 | | 372-374 |
| | 125-162 | | 411-431 |
| | 210-225 | | 453-528 |
| | 246-248 | | 566-582 |
| | 276-318 | | 609-637 |
| | 381-436 | | 677-710 |
| | 442-503 | | 727-729 |
| | 537-557 | | 792-813 |
| | 559-565 | | 934-958 |
| | 611-653 | R-5 | 43-56 |
| | 662-688 | | 76-78 |
| | 731-763 | | 164-220 |
| | 773-798 | | 297-315 |
| | 880-893 | | 348-410 |
| | 939-998 | | 455-475 |
| R-3 | 20-30 | | 488-572 |
| | 32-48 | | 644-683 |
| | 51-108 | | 722-759 |
| | 232-244 | | 803-858 |
| | 262-293 | | 942-944 |
| | 342-362 | | 964-982 |

*Fig. 3A*

DATA SORTING METHOD AND SYSTEM

FIELD

The technology described in this patent document relates generally to data sorting. More specifically, this document describes systems and methods for sorting data using a multi-block floating buffer.

BACKGROUND

Sorting is the process of ordering items based on specified criteria. In data processing, sorting indicates the sequencing of records using a key value determined for each record. If a group of records is too large to be sorted within available random access memory, then a two-phase process, referred to as external sorting, may be used. In the first phase of the external sorting process, a portion of the records is typically sorted and the partial result, referred to as a sorted run, is stored to temporary external storage. Sorted runs are generated until the entire group of records is exhausted. Then, in the second phase of the external sorting process, the sorted runs are merged, typically to a final output record group. If all of the sorted runs cannot be merged in one pass, then the second phase may be executed multiple times in a process commonly referred to as a multi-pass or multi-phase merge. In a multi-phase merge, existing runs are merged to create a new, smaller replacement set of runs.

The records within a sorted run are typically written to external storage in sequential blocks of data, such that each block includes an integral number of records. The performance of typical merging and forecasting algorithms can be greatly affected by the size of the record block. For example, when sorting randomly ordered records, poor merge performance may result from the selection of small block size because disk latency, which may be orders of magnitude larger than any other delay (e.g., memory access latency) encountered during merging, can dominate processing time. One method of increasing merge performance is to establish a large block size so that access costs (i.e., time spent locating the blocks) are insignificant compared to transfer costs (i.e., time spent reading the blocks.) However, a large block size may also decrease performance by resulting in a multi-pass merge and, consequently, increased processing time and increased temporary storage requirements.

Another method for increasing performance during the merge phase is to eliminate time spent stalled on input (i.e., waiting for a record block to be retrieved from external storage) by reading blocks from storage in advance of their need while the merge is in progress. One algorithm used to achieve such parallelism is referred to as forecasting with floating buffers. This forecasting algorithm, designed to execute concurrently with the merge algorithm, reads blocks in the same sequence that the merge algorithm requires them. A typical forecasting algorithm determines which run to read next by comparing the largest key value of the last block read from each run being merged. The run associated with the smallest such key is the run from which the next block is read. The buffers, into which blocks are read, may be used to read data from any run, and are thus said to float among the runs.

SUMMARY

In accordance with the teachings described herein, systems and methods are provided for data sorting. A method for use with one or more processing devices in order to merge sorted runs of data may include the steps of: defining a plurality of floating buffers; calculating a number of data blocks for each floating buffer; configuring the floating buffers to store the number of data blocks; and using the floating buffers to perform an external data sorting operation. A data sorting system may include one or more programs, and may be used with a plurality of floating buffers and a data storage device for storing a plurality of sorted runs of data blocks, each data block including a plurality of data records. The one or more programs in a data sorting system may be operable to calculate a number of data blocks for each floating buffer and configure the plurality of floating buffers to store the number of data blocks. In addition, the one or more programs in a data sorting system may be further operable to sort the plurality of data records into a single sorted output run using the plurality of floating buffers. In other examples, the number of data blocks in the plurality of floating buffers may be pre-determined or may be calculated by a different system using the techniques described herein.

BRIEF DESCRIPTION OF THE DRAWINGS

FIGS. 3A-3C illustrate an example operation of a data sorting system.

DETAILED DESCRIPTION

Figure 1:
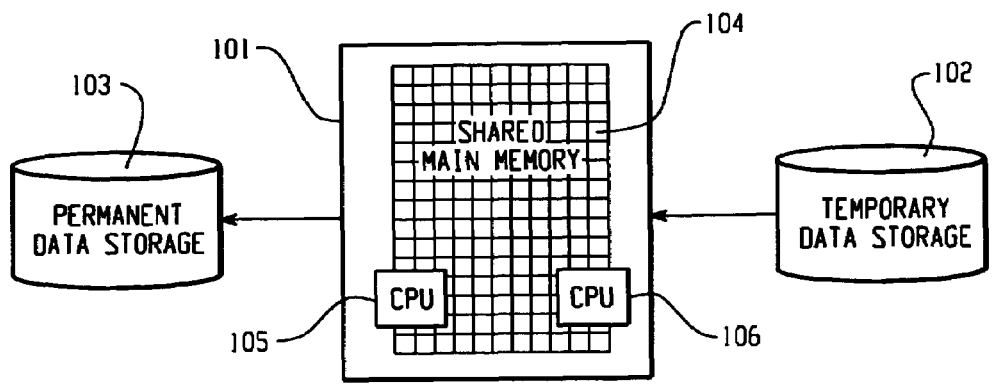
FIG. 1 is a block diagram of an example data sorting system for performing an external sorting operation.

FIG. 1 is a block diagram of an example data sorting system for performing an external sorting operation. The system includes a computing machine 101, a temporary data storage device 102 and a permanent data storage device 103. The computing machine 101 may include a multiprocessor computer architecture having two independent central processing units (CPUs) 105, 106 that share access to a common random access memory (RAM) 104. However, it should be understood that different computing devices may be used, such as computing devices that have a single processing device.

The temporary and permanent data storage devices 102, 103 are direct access storage devices accessible by the computing machine 101. The temporary data storage device 102 is used to store a plurality of sorted runs of data blocks, such as, but not limited to, in a single computer file. The sorted runs are merged (e.g., into a single sorted computer file) and the sorted output is stored in the permanent data storage device 103. The external sorting process may be performed by a forecasting program and a merge program, which may, for example, be independently executed as two separate threads of execution that are respectively executed by the multiple CPUs 105, 106 of the computing machine 101. It should be understood, however, that the forecasting and merge programs may be implemented in different ways, such as using a single processing device. In addition, the sorted runs and sorted output may be stored in other types of memory devices and/or memory configurations, which may be either external or internal to the computing machine 101.

Figure 2:
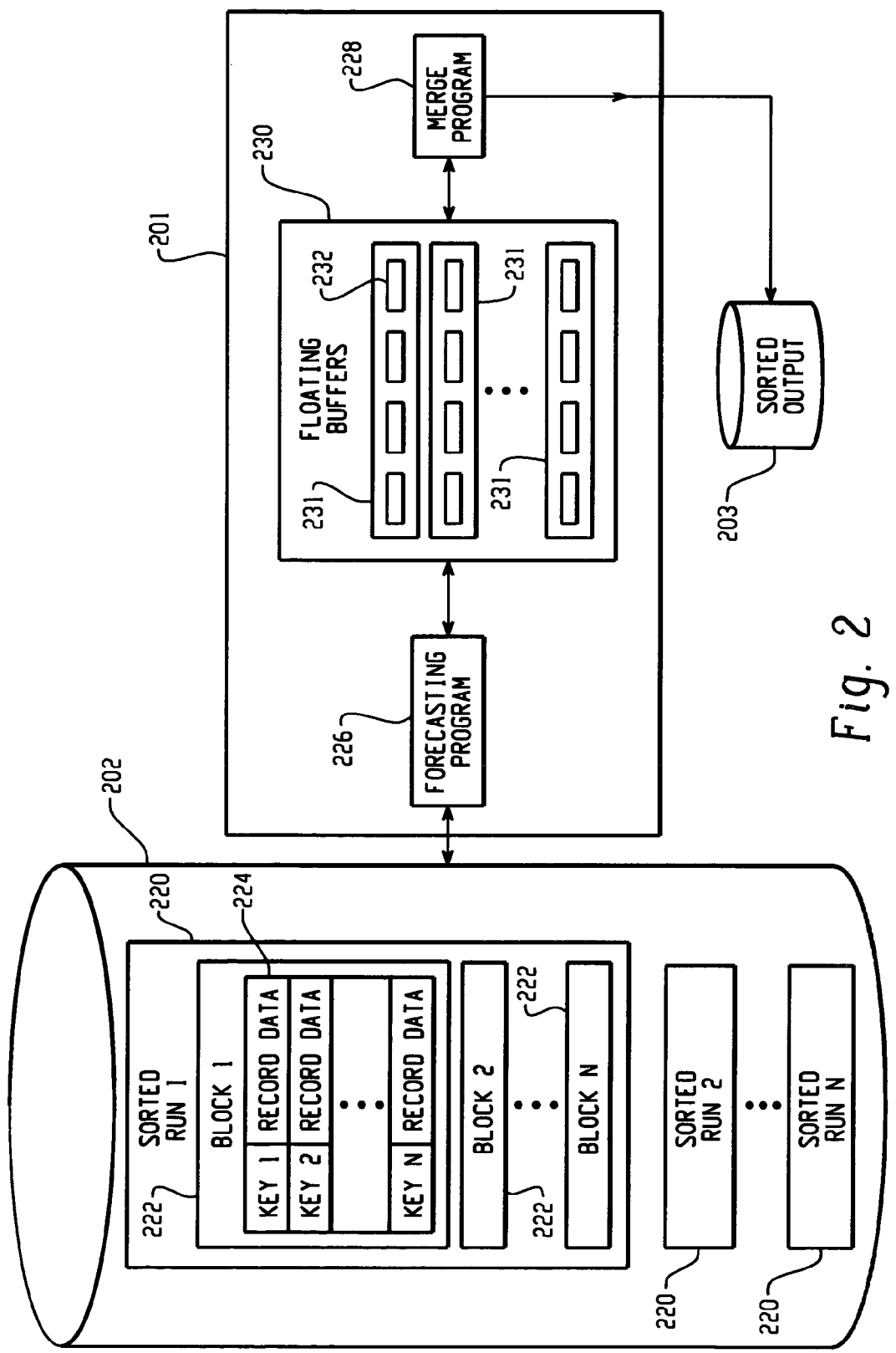
FIG. 2 is a block diagram of an example data sorting system showing sorted runs.

FIG. 2 depicts multiple sorted runs 220 for processing by a data sorting system. The data sorting system includes a computing machine 201, a first data storage device 202 for storing sorted runs 220 of data blocks 222, and a second data storage device 203 for storing sorted output. However it should be understood that other configurations can be used, such as the sorted runs 220 and the sorted output 203 may be stored in a single data storage device.

The sorted runs 220 can be stored in a single file within the first data storage device 202. The sorted runs 220 include a plurality of data blocks 222, and the data blocks 222 store a plurality of data records 224. The data records 224 may include both record data and key values. The key value associated with a particular data record 224 may be extracted from or included with the data record 224. The record data 224 within each sorted run 220 is sorted according to the keys (e.g., in ascending or descending order.) An example of a sorted run showing sorted record keys is described below with reference to FIG. 3A.

The computing machine 201 includes a forecasting program 226, a merge program 228, and a plurality of floating buffers 230. The forecasting program 226 and merge program 228 are stored in a memory location in the computing machine 201 and are executed by one or more processing devices in the computing machine 201 to perform an external sorting operation. For example, the forecasting program 226 and merge program 228 may be two separate threads of execution that are respectively executed by multiple CPUs 105, 106 of the computing machine 101, as described above with reference to FIG. 1.

The floating buffers 230 may, for example, be memory locations defined in one or more memory devices on the computing machine 201. Each floating buffer 231 is configurable to store a plurality of data blocks 232. The number of data blocks 232 in a floating buffer 231 may, for example, be configured by the merge program 228, as described below. However, other approaches can be used, such as the number of data blocks 232 in the floating buffers 231 may be determined by a program other than the merge program 228 or may be determined by user input.

In operation, the data blocks 222 from the sorted runs 220 are read into the floating buffers 230 and are merged by the merge program 228 to generate the sorted output 203. As the merge program 228 progresses, depleted buffers 230 are passed to the forecasting program 226 to be repopulated from the sorted runs 220. The forecasting program 226 begins its operation by attempting to acquire one or more empty buffers 230 but, failing that, may either allocate a new floating buffer 231, if memory limits permit, or wait until a buffer 231 becomes available from the merge program 228. The forecasting program 226 then reads data blocks 222 from the sorted runs 220 into one or more floating buffers 230 in advance of their need by the concurrently executing merge program 228.

In order for the forecasting program 226 to operate concurrently (if desired) with the merge program 228, one or more floating buffers 230 should be available beyond the number required to perform the merge operation. If no extra buffers 230 are available, then the forecasting program 226 waits for the merge program 228 to deplete a buffer 231 and pass the empty buffer 231 to the forecasting program 226 so that it may initiate a read request. With one extra floating buffer 231, the forecasting program 226 can determine which data block 222 will be needed next by the merge program 228, and initiate a read request while the runs are being merged. Upon completing the read request, the forecasting program 226 passes the newly populated floating buffer to the merge program 228 as needed, and waits for another empty buffer 231.

In some instances, two or more floating buffers may near depletion around the same time during a merge. In this case, a single extra floating buffer 231 may not suffice for full parallelism because the merge program 228 will attempt to retrieve two or more filled replacement buffers in quick succession from the forecasting program 226. The first attempt by the merge program 228 to retrieve a replacement buffer will succeed if the forecasting program 226 has already filled the one extra buffer 231. However, subsequent attempts to retrieve a replacement buffer may stall because, without additional buffers, replacements cannot be produced in advance. The likelihood of this occurrence depends upon the initial order of the input records to be sorted. For records that are already ordered, there is usually no chance that two or more buffers will near depletion together because the merge program 228 will draw records sequentially from each buffer 231, read blocks sequentially from each run 220, and tap the runs 220 in sequence. However, for records that are randomly ordered, it may occur that all of the buffers will near depletion together because the merge program 228 will draw records alternately and with roughly equal probability from among the buffers 230. This latter situation results in a near immediate need for replacement buffers by the merge program 228 for every run 220 being merged. Thus, to facilitate full parallelism between the forecasting program 226 and the merge program 228, the total number of floating buffers 230 allocated to the forecasting and merge programs 226, 228 should be twice the number of runs 220 being merged. Though not necessary to achieve full parallelism, additional floating buffers 230 beyond this number may be useful in maintaining a steady flow of data to the merge program 228 and smoothing the burst of input demands on the operating system and hardware in a multi-user or multi-tasking system.

In addition, as noted above, the number of blocks 232 available in each floating buffer 231 will affect the access costs of the sorting system. The following mathematical process may be used to determine the optimum number of blocks 232 for each floating buffer 231. This mathematical process may also be used to determine the amount of memory needed for the floating buffers 230 in order to achieve a desired reduction in disk access costs and full parallelism between the forecasting program 226 and the merge program 228.

As shown by the example mathematical process below, when retrieving a block from a sorted run, the retrieval of additional, logically successive blocks from the run can reduce access costs by avoiding the disk latency often associated with locating the additional blocks. Access costs can be reduced, therefore, by effectively increasing the number of blocks read per access instead of increasing the block size. For arbitrary block sizes, the performance benefits afforded by forecasting can be attained by allowing the forecasting algorithm to support input into multi-block floating buffers and ensuring that access costs are acceptably reduced by adjusting the number of blocks per floating buffer. This scheme may also provide flexibility in the merge phase by allowing some control over the number of passes required to complete the external sort because the number of blocks per floating buffer can be adjusted to allow for a greater or fewer number of buffers and, consequently, directly affect the number of runs that may be merged in a single pass.

The time required to read data from storage 202 dictates the speed at which sorted runs 220 may be merged, assuming no disk latency costs. This time is equivalent to the time required to read the entire file sequentially and can be calculated as follows:

$$t = \frac{F}{\rho},$$

where t is the I/O time, F is the file size (bytes), and ρ is the disk transfer rate (bytes/second).

If we assume that the file size (F) is some integer multiple of the block size (B), such that $F = n_{blocks} \times B$, where B is the block 222 size (bytes) and $n_{blocks}$ is the number of blocks in the file, then the equation becomes:

$$t = n_{blocks} \times \frac{B}{\rho}.$$

Disk latency (L) is the sum of the positional latency (s) and the rotational latency (r). Assuming a non-zero disk latency (L) and that access costs are encountered for every block, then the time required to read the file may be expressed as follows:

$$t = n_{blocks} \times \left(\frac{B}{\rho} + L\right).$$

Thus, the percentage of time spent locating blocks may be expressed as follows:

$$q = \frac{n_{blocks} \times L}{n_{blocks} \times \left(\frac{B}{\rho} + L\right)} \times 100;$$

which simplifies to:

$$q = \frac{L}{\left(\frac{B}{\rho} + L\right)} \times 100.$$

The percentage of time spent locating blocks is not dependent upon the number of blocks in the file and, therefore, is independent of the file size. The total time spent locating blocks may be reduced by reading not only the next block that is required, but also reading one or more subsequent blocks from the same run 220. Because the additional blocks are likely to be adjacent to the first located block, there should be no location costs incurred to read the additional blocks. If the number of blocks read are increased by a factor of N for each disk access, where N is the number of blocks in each buffer 231, the disk latency percentage may be reduced to:

$$q = \frac{L}{\left(\frac{NB}{\rho} + L\right)} \times 100.$$

The above equation may be used to establish a cap (Q) on the amount of time spent locating blocks, as follows:

$$\frac{L}{\left(\frac{NB}{\rho} + L\right)} \times 100 \leq Q,$$

where Q is the desired maximum percentage of total time consumed by disk latency. The number of blocks per floating buffer (N) that will satisfy this relation may then be established, as follows:

$$N \geq \frac{\rho L \left(\frac{100}{Q} - 1\right)}{B}.$$

That is, any number of blocks per floating buffer (N) that is greater than or equal to $$\frac{\rho L \left(\frac{100}{Q} - 1\right)}{B}$$

will cause the latency, as a percentage of total input time, to be reduced to Q or below. Thus, the smallest number of blocks per floating buffer (N) that will produce the desired reduction of latency may be expressed as:

$$N = \left\lceil \frac{\rho L \left(\frac{100}{Q} - 1\right)}{B} \right\rceil.$$

As discussed above, the number of available floating buffers 230 needed to achieve full parallelism between the forecasting program 226 and the merge program 228 is equal to twice the number of runs to be merged ($n_{runs}$). Thus, the memory requirements to satisfy latency reduction and to provide full parallelism may be expressed as:

$$M = (2 \times n_{runs}) \times (N \times B).$$

The following example examines the Hitachi Deskstar 180GXP hard disk drive (Model IC35L180AVV207-I), which has the following specifications.

| Hitachi Deskstar 180GXP Hard Drive Specifications | |
| --- | --- |
| Specification | Value |
| Latency average (ms) | 4.17 |
| Average seek time (ms) | 8.80 |
| Sustained data rate (MB/sec) | 29 to 56 |

The latency average in the above hard drive specifications refers to average rotational latency, which is the amount of time required for the disk to complete half a rotation. The Hitachi Deskstar 180XP rotates at 7200 rpm, yielding an average rotational latency (r) of 4.17 ms. The average seek time is also referred to as average positional latency (s). Using the smaller value of the specified sustained data rate range, 29 MB/s, yields a transfer rate (ρ) of 30,408,704 bytes per second (with 1 MB=$2^{20}$ bytes). The derived parameters of the Hitachi Deskstar 180GXP hard drive are as follows:

| Hitachi Deskstar 180GXP Derived Hardware Parameters | |
|---|---|
| Parameter | Value |
| Positional latency (s) | 0.00417 |
| Rotational Latency (r) | 0.00880 |
| Disk Latency (L = s + r) | 0.01297 |
| Disk transfer rate (ρ) | 30,408,704 |

For the purposes of this example, assume that a 128 MB data set is being sorted using 32 MB of random access memory. Further assume that the first phase of the external sorting process (e.g., the creation of the sorted runs) resulted in 4 sorted runs of 64 KB blocks. Then, if a percentage latency cap, Q, of 10% is desired, the sorting dimensions are as follows.

| Sorting Dimensions | |
|---|---|
| Dimension | Value |
| File size (bytes) (F) | 134,217,728 |
| Block size (bytes) (B) | 65,536 |
| Number of sorted runs ($n_{runs}$) | 4 |
| Percentage latency cap (Q) | 10% |

Using these parameters, the number of blocks 232 per floating buffer 231 that will satisfy a 10% latency cap (Q) may be determined, as follows.

$$N = \left\lceil \frac{\rho L\left(\frac{100}{Q} - 1\right)}{B} \right\rceil = \left\lceil \frac{30408704 \times 0.01297\left(\frac{100}{10} - 1\right)}{65536} \right\rceil = 55.$$

Figure 3B:
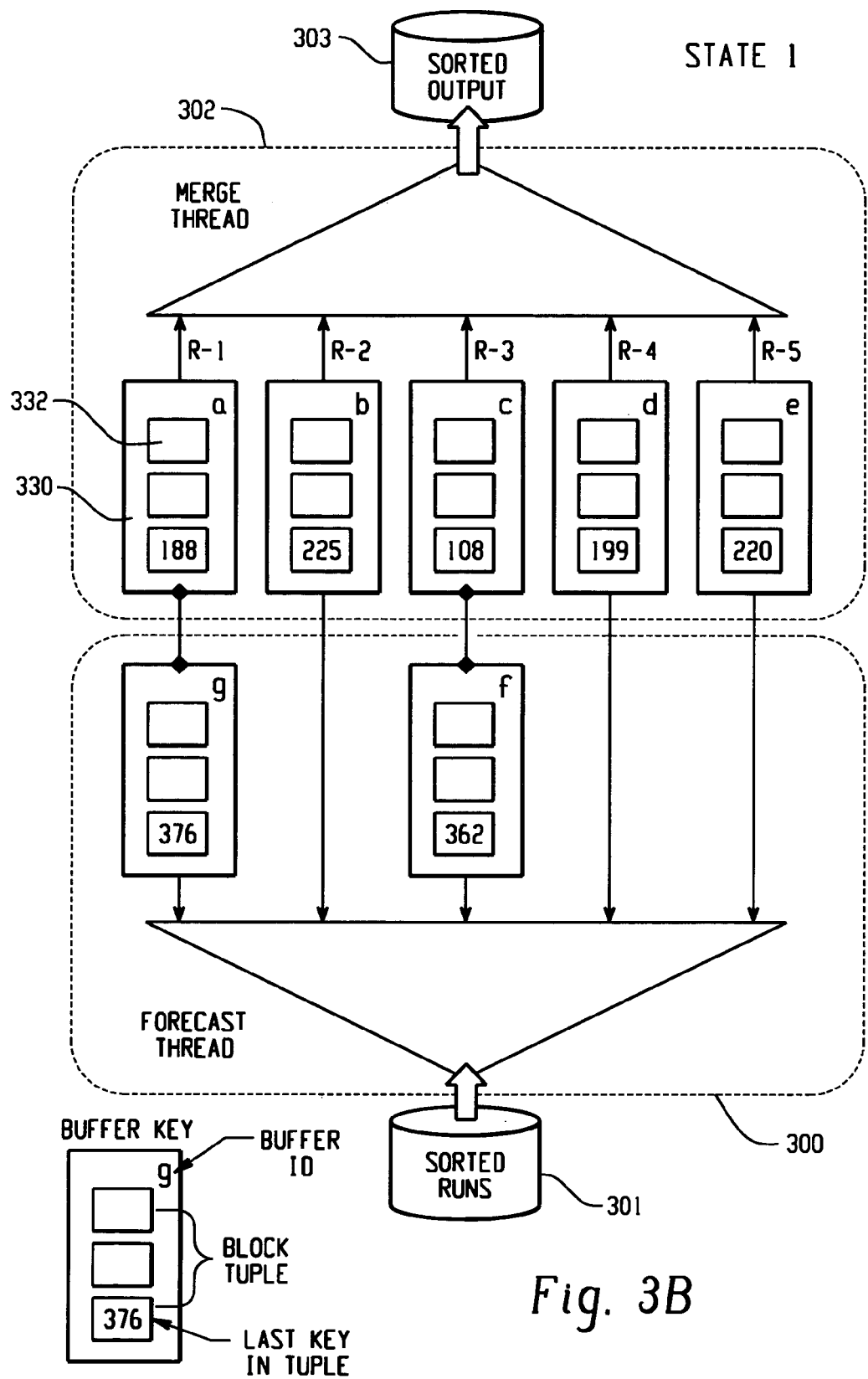
Figure 3C:
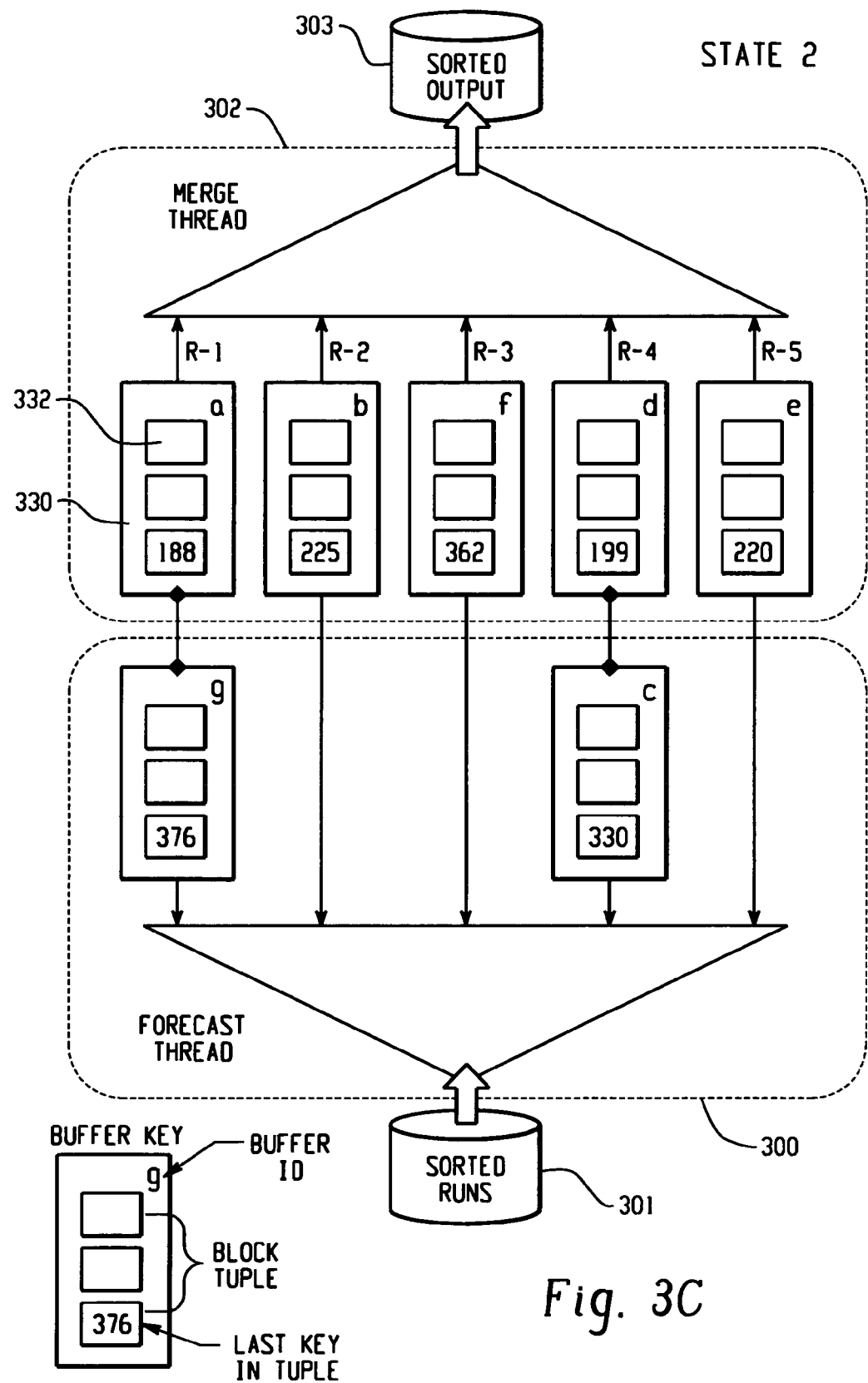

With reference now to FIGS. 3A-3C, a block diagram is provided to illustrate an example operation of a data sorting system. FIG. 3A illustrates an example of sorted runs stored in a data storage device. FIG. 3B illustrates the operation of a forecasting program and a merge program during a merge. FIG. 3C illustrates the operation of a forecasting program to replace floating buffers depleted by a merge program during the merge. This example illustrates just one of many ways to implement a merge program and a forecast program. In this example, merge operations and forecast operations are respectively performed by a merge thread 302 and a forecast thread 300 in a multi-thread environment.

With reference first to FIG. 3A, a stored file is illustrated that includes five sorted runs 320 (R-1 through R-5). The sorted runs 320 include a plurality of data blocks 322 that store the sorted data records. The range of key values for the data records 324 stored in each of the data blocks 322 are shown in FIG. 3A. For example, the first data block 322 in the first sorted run (R-1) includes sorted data records 324 having key values starting at 35 and ending at 80.

With reference now to FIG. 3B, a merge program loads blocks 322 from each run 320 into an initial set of floating buffers 330. The floating buffers 330 in this example each include three blocks 332. Thus, the first three blocks 322 from each run 320 are loaded into an initial set of buffers (labeled a-e). The blocks of data 332 within a buffer are referred to herein as a block tuple. For convenience, only the last key value in each block tuple is shown in the diagram. Once the initial set of buffers (a-e) is loaded, the merge thread 302 begins comparing the data records in the buffers (a-e) to generate the sorted output 303.

Concurrent with the operation of the merge program, the forecasting thread 300 acquires floating buffers (g and f) that are not in use by the merge thread 302. As discussed above, for full parallelism between the merge thread 302 and forecasting thread 300 there can be an equal number of floating buffers available to the forecasting thread 300. However, for the purposes of this example, only two additional floating buffers (g and f) are available. The forecasting thread 300 determines the order in which the buffers (a-e) being used by the merge thread 302 will be depleted, and assigns the additional buffers (g and f) based on this determination. The order of buffer depletion by the merge program may be determined by comparing the last key in each block tuple.

In the illustrated example, the last key in floating buffer "c" has the lowest value (108). Thus, the forecasting thread 300 determines that floating buffer "c" will be depleted first and assigns the additional buffer "f" to the third sorted run (R-3). The forecasting thread 300 then initiates a read request to fill the additional buffers "f" from the next three data blocks 322 from sorted run "R-3," having a key value range of 232 through 362. Similarly, the additional buffer "g" is next assigned to and filled from the first sorted run (R-1), which has the second lowest value (188) in its last key position.

Once the merge thread 302 has depleted a buffer 330, the depleted buffer is passed to the forecasting thread 300 and is replaced with a populated buffer 330, as illustrated in FIG. 3C. In FIG. 3C, the forecasting thread 300 has replaced depleted floating buffer "c" with populated buffer "f." The forecasting thread 300 has then reassigned the depleted buffer "c" to sorted run "R-4," which has the next lowest last key value (199), and repopulated buffer "c" with the next three data blocks 322 from the run 320.

Figure 4:
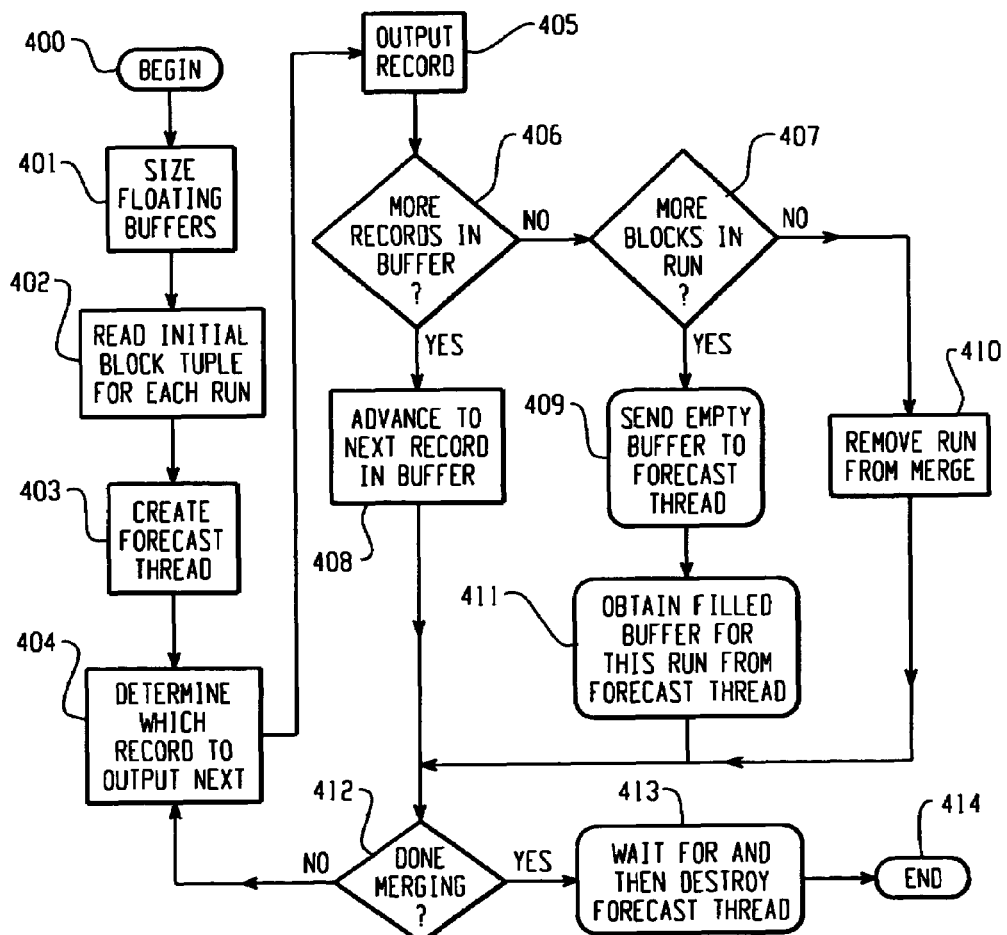
FIG. 4 is a flow diagram illustrating an example operational scenario for merging sorted runs.

FIG. 4 is a flow diagram illustrating an example method of merging sorted runs, which may be performed by a merge program. The method begins at step 400. At step 401, the method determines the number of data blocks in the floating buffers. This step 401 may, for example, be performed using the calculations described above with reference to FIG. 2. After the buffers have been sized, the initial set of buffers (one buffer for each run being merged) is allocated and filled from the stored sorted runs at step 402. Once the initial buffers are filled, a forecasting method is initialized at step 403. An example forecasting method is described below with reference to FIG. 5.

Starting at step 404, the method proceeds into its primary loop of execution. At step 404, the method determines which record should next be merged from the buffers to the sorted output. When the next record to be merged is identified, the record is copied from the buffer to the sorted output file at step 405. Then, at step 406, the method determines if there are more records to be merged from the same buffer. If the buffer includes more records to be merged, then the method advances to the next record in the buffer at step 408 and proceeds to step 412. Else, if there are no more records in the buffer, then the method proceeds to step 407.

At step 407, the method determines if there are more blocks to be merged from the same sorted run. If not, then the run is removed from the merge process (step 410) and the method proceeds to step 412. If there are more blocks to be merged from the run, however, then the depleted buffer is released to the forecasting process at step 409, a filled buffer for the same sorted run is obtained from the forecasting process at step 411, and the method proceeds to step 412.

At step 412, the method determines if the records in all of the sorted runs have been merged. If not, then the method returns to step 404 to repeat the primary loop of execution. Otherwise, if there are no additional records to be merged, then the method waits for the forecasting method to terminate at step 413, and the method ends at step 414.

Figure 5:
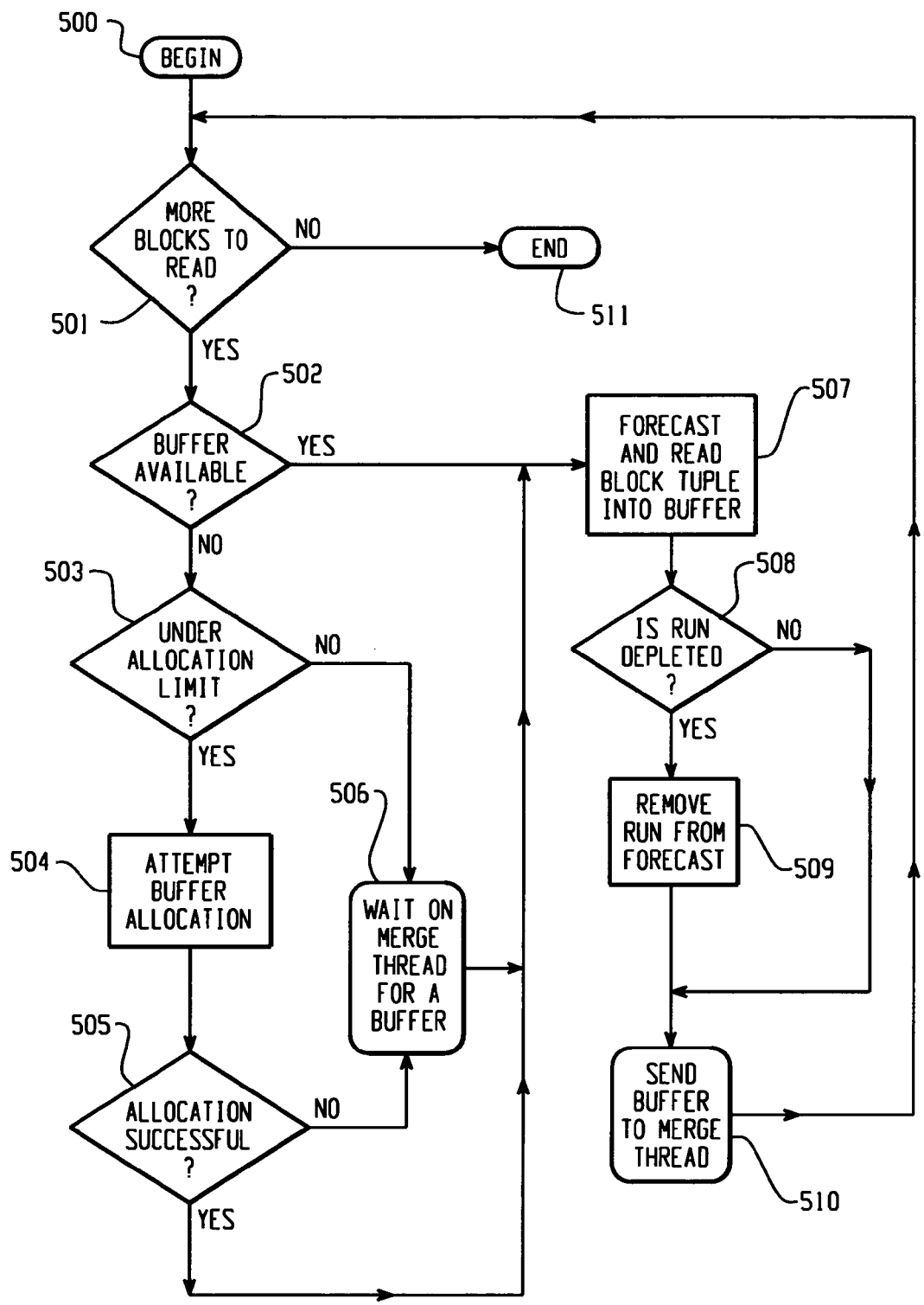
FIG. 5 is a flow diagram illustrating an example operational scenario involving forecasting.

FIG. 5 is a flow diagram illustrating an example forecasting method. The method begins at step 500. At step 501, the method determines if there are any further blocks to read in the sorted runs. If not, then the method ends at step 511. Otherwise, if there are additional blocks to be read, then the method determines at step 502 whether there are any empty floating buffers available. If there are no floating buffers available, then the method proceeds to step 503. Else, if an empty floating buffer is available, then the method proceeds to step 507.

At step 503, the method determines if the total amount of memory allocated for the floating buffers is below a selected limit. If the allocated memory is below the selected limit, then the method attempts to allocate an additional floating buffer at step 504. If successful in allocating the additional floating buffer (step 505), then the method proceeds to step 507. However, if either the allocation limit has been reached (step 503) or the method is not successful in allocating an additional floating buffer (step 505), then the method waits for a depleted buffer to be passed from the merging method at step 506, and proceeds to step 507 when a buffer is available.

Once a free floating buffer is acquired, the method forecasts which data blocks from the stored sorted runs will next be required by the merging method and reads those blocks into the free buffer at step 507. This forecasting step (step 507) may be performed by inspecting the last record of each sorted run that is currently buffered. The run associated with the record having the smallest key value for its last buffered record is the sorted run from which a new range of data blocks should be read next. Once the next block tuple is read into a floating buffer at step 507, the method determines at step 508 if there are any unread blocks remaining in the same sorted run. If unread blocks remain in the sorted run, then the method proceeds to step 510. Else, if there are no additional blocks to be read from the sorted run, then the run is removed from the forecasting process at step 509, and the method proceeds to step 510. At step 510, the newly filled buffer is transferred to the merging method, and the method returns to step 501.

It should be understood that similar to the other processing flows described herein, the steps and the order of the steps in the flowchart described herein may be altered, modified, deleted and/or augmented and still achieve the desired outcome.

Figure 6:
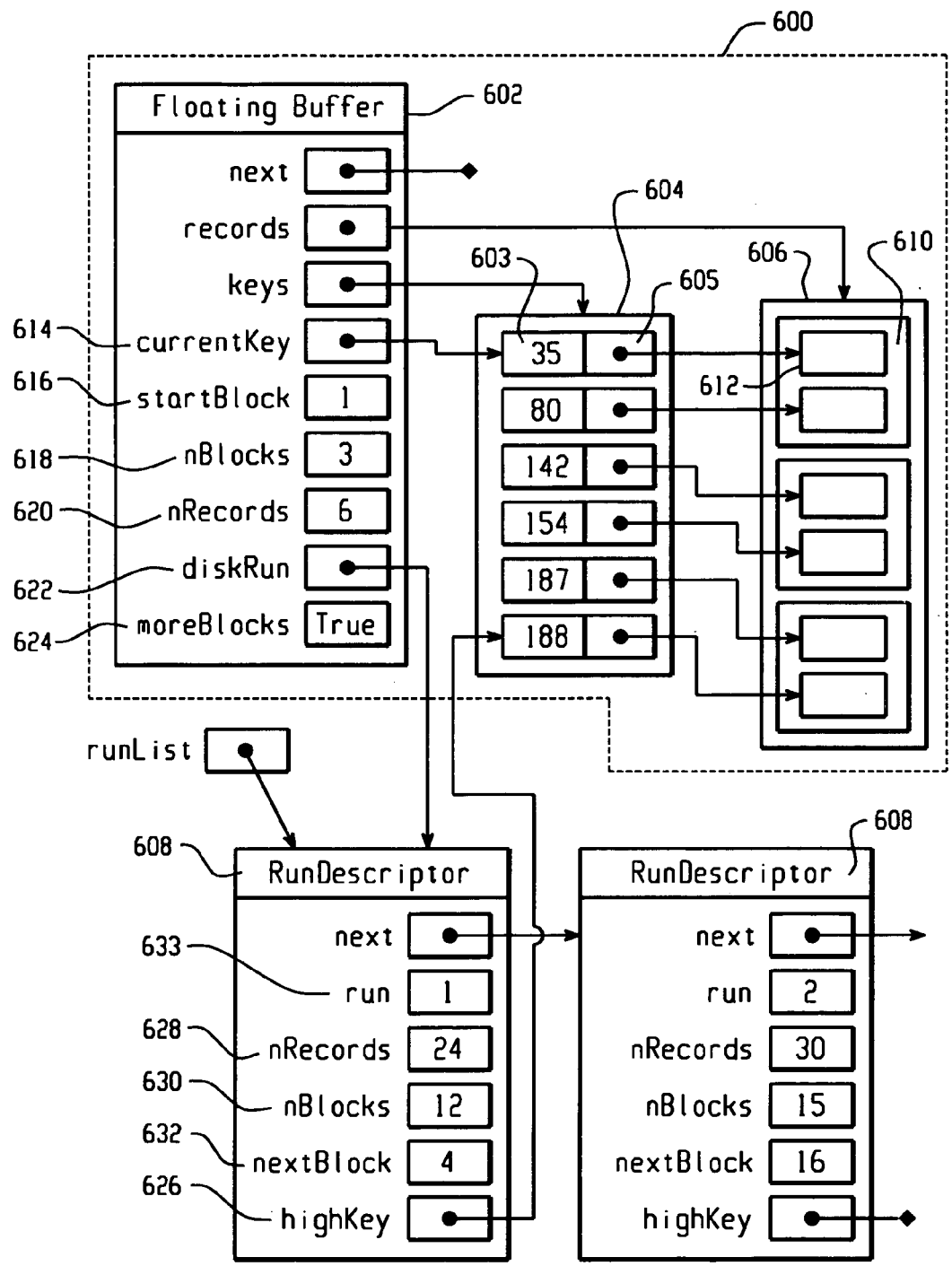
FIG. 6 is a block diagram illustrating an example data structure for a multi-block floating buffer.

This written description uses examples to disclose the invention, including the best mode, and also to enable a person skilled in the art to make and use the invention. The patentable scope of the invention may include other examples that occur to those skilled in the art. As an example of the wide scope of the systems and methods disclosed herein, various data structures can be used. FIG. 6 is a block diagram illustrating an example data structure for a multi-block floating buffer 600. The floating buffer 600 includes a buffer data structure 602 and two separately allocated memory spaces 604, 606: a first memory space 604 to store pairs of record keys 603 and associated record pointers 605 (referred to herein as the "key space" or a "key memory location"); and a second memory space 606 to store the record blocks (referred to herein as the "record space" or "record memory location"). Also illustrated are a plurality of run descriptor data structures 608.

After a sorted run is created during the first stage of an external sorting process, the attributes of the sorted run are recorded in a run descriptor data structure 608. Run descriptor data structures 608 are chained together (via the "next" field) to form a list, referred to herein as a "run list." The run list is carried into the second (merge) phase of the external sorting process and is used by the merging and forecasting programs to track which data blocks have been retrieved from storage.

With reference to the floating buffer 600, the record space 606 is sized to hold one or more record blocks 610 and the key space 604 is sized to hold a corresponding number of keys 603. In this particular example, both the record and key spaces 604, 606 are monolithic allocations (e.g., the memory within a space is contiguous.) After blocks are read from storage into a buffer, key values (on which records are to be ordered) are projected from the records into the key space 604 and, for each key 603, a record pointer 605 is set to indicate the source record 612.

After a buffer is loaded, values are set in the buffer data structure 602 for a current key pointer 614, a start block identifier 616, a total block identifier 618, a total records identifier, 620, a disk run pointer 622 and a more blocks identifier 624. The current key pointer 614 indicates the smallest (top) key 603 in the buffer. The start block identifier 616 indicates the first block loaded into the buffer. The total block identifier 618 indicates the number of blocks loaded into the buffer. The total records identifier indicates the number of records loaded into the buffer. The disk run pointer 622 identifies the run descriptor data structure 608 for the sorted run from which the blocks were read. The more blocks identifier 624 indicates whether there are more blocks remaining to be read from the sorted run.

In addition, the run descriptor data structure 608 is also updated after a buffer is loaded to set values for a high key pointer 626, a total records identifier 628, a total blocks identifier 630 and a next block identifier 632. The high key pointer 626 indicates the largest (bottom) key within the key space 604 of the floating buffer 600. The total records identifier 628 indicates the number of records remaining in the sorted run. The total blocks identifier 630 indicates the number of records remaining in the sorted run. The next block identifier 632 indicates the next block in the sorted run to be loaded into the floating buffer 600.

A merge program may maintain a priority queue of floating buffers 600, containing one floating buffer for each sorted run being merged. The current key pointer 614 in the buffer data structure 602 is used to order buffers within the queue by comparing the current key value for all of the buffers. Ties may be resolved using the run ordinal 633 within the corresponding run descriptor data structure 608. The priority queue may provide immediate access to the floating buffer containing the smallest key value 603 (indicated by the current key pointer value 614 for that buffer.) The record from which the smallest key value originated is then emitted, the current key pointer 614 is updated to point to the next key 603 in the key space 604, and the priority queue is adjusted to locate the buffer with the next smallest key value.

A forecasting program may maintain a priority queue of run descriptors 608, containing one run descriptor for each run being merged. The high key pointer 626 is used to order descriptors within the queue by comparing the highest key value for every participating run that has been buffered. Ties may be resolved using the run ordinal, ensuring that the forecasting read sequence is the same as the merge consumption sequence. The priority queue may provide immediate access to the run descriptor 608 pointing to the smallest high key value 626. The sorted run associated with this run descriptor is the sorted run from which the next record block or blocks should be read. After a buffer is obtained and filled with the record blocks from the sorted run, the run descriptor data structure 608 is updated and the priority queue is adjusted to locate the run descriptor which points to the next smallest high key value 626.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A method for use with one or more processing devices in order to merge sorted runs of data, comprising:
   prior to beginning a merging process:
      defining a plurality of floating buffers;
      calculating a number of data blocks for each floating buffer; and
      configuring the floating buffers to store the number of data blocks; and
   during the merging process:
      using the floating buffers to perform an external data sorting operation to generate a sorted output; and
      storing the sorted output in a computer readable medium;
   wherein the number of data blocks for each floating buffer is calculated to achieve an optimal number of data blocks for each floating buffer, and wherein the optimal number of data blocks is the number for achieving a selected reduction in disk latency costs; and
   wherein the data blocks store a plurality of data records, and further comprising:
      comparing the data records in a first set of floating buffers to generate the sorted output;
      copying additional data blocks from a plurality of sorted runs into a second set of floating buffers before the additional data blocks are used by the comparing step; and
      replacing depleted floating buffers from the first set with floating buffers from the second set containing the additional data blocks.

2. The method of claim 1, wherein the external sorting operation is performed using a merge program.

3. The method of claim 1, wherein the external sorting operation is performed using a forecasting program.

4. The method of claim 1, wherein the external sorting operation is performed using a merge program and a forecasting program, and wherein the optimal number of data blocks is the number needed to achieve full parallelism between the merge program and the forecasting program.

5. A data sorting system for use with a plurality of floating buffers and a data storage device for storing a plurality of sorted runs of data blocks, each data block including a plurality of data records, the data sorting system comprising:
   one or more programs operable to calculate a number of data blocks for each floating buffer and configure the plurality of floating buffers to store the number of data blocks prior to executing a merge program, the merge program being operable to sort the plurality of data records into a single sorted output using the plurality of floating buffers;
   wherein the number of data blocks is calculated to achieve an optimal number of data blocks for each floating buffer, and wherein the optimal number of data blocks is the number needed to achieve a desired reduction in disk latency costs;
   wherein the one or more programs include the merge program and a forecasting program;
   the merge program is operable to compare data record keys in a first set of floating buffers to generate the single sorted output; and
   the forecasting program is operable to copy additional data blocks from the data storage device into a second set of floating buffers before the additional data blocks are used by the merge program and to replace depleted floating buffers from the first set with floating buffers from the second set.

6. A data sorting system, comprising:
   a computing device having a plurality of floating buffers;
   a data storage device for storing a plurality of sorted runs of data blocks, each data block including a plurality of data records;
   one or more programs stored in a memory location on the computing device, the one or more programs when executed by the computing device being operable to calculate a number of data blocks for each floating buffer and configure the plurality of floating buffers to store the number of data blocks prior to executing a merge program, the merge program being operable to sort the plurality of data records into a single sorted output using the plurality of floating buffers;

wherein the number of data blocks is calculated to achieve an optimal number of data blocks for each floating buffer, and wherein the optimal number of data blocks is the number needed to achieve a desired reduction in disk latency costs;

wherein the one or more programs include the merge program and a forecasting program;

the merge program is operable to compare data record keys in a first set of floating buffers to generate the single sorted output;

the forecasting program is operable to copy additional data blocks from the data storage device into a second set of floating buffers before the additional data blocks are used by the merge program and to replace depleted floating buffers from the first set with floating buffers from the second set.

7. A data sorting system for use with a plurality of floating buffers and a data storage device for storing a plurality of sorted runs of data blocks, each data block including a plurality of data records, the data sorting system comprising:

one or more programs stored on a computer readable medium and executable by a computer, when executed the one or more programs being operable to calculate a number of data blocks for each floating buffer and configure the plurality of floating buffers to store the number of data blocks;

the one or more programs merge program being further operable to sort the plurality of data records into a single sorted output using the plurality of floating buffers and to store the single sorted output to a memory location;

wherein the number of data blocks is calculated to achieve an optimal number of data blocks for each floating buffer, and wherein the optimal number of data blocks is calculated using the equation:

$$N = \left\lceil \frac{\rho L\left(\frac{100}{Q} - 1\right)}{B} \right\rceil,$$

where N represents the optimal number of data blocks, 9 is the disk transfer rate of the data storage device, L is the disk latency of the data storage device, Q represents the desired maximum percentage of total time consumed by disk latency, and B is the size of each data block;

wherein the one or more programs include a merge program and a forecasting program;

the merge program is operable to compare data record keys in a first set of floating buffers to generate the single sorted output; and the forecasting program is operable to copy additional data blocks from the data storage device into a second set of floating buffers before the additional data blocks are used by the merge program and to replace depleted floating buffers from the first set with floating buffers from the second set.

8. The data sorting system of claim 7, wherein the optimal number of data blocks is the number needed to achieve a desired reduction in disk latency costs.

9. The data sorting system of claim 7, wherein the one or more programs include a merge program and a forecasting program.

10. A data sorting system, comprising:

a computing device having a plurality of floating buffers;

a data storage device for storing a plurality of sorted runs of data blocks, each data block including a plurality of data records; and one or more programs stored in a memory location on the computing device, the one or more programs when executed by the computing device being operable to calculate a number of data blocks for each floating buffer and configure the plurality of floating buffers to store the number of data block;

the one or more programs being further operable to sort the plurality of data records into a single sorted output using the plurality of floating buffers and to store the single sorted output to a computer readable medium;

wherein the number of data blocks is calculated to achieve an optimal number of data blocks for each floating buffer, and wherein the optimal number of data blocks is calculated using the equation:

$$N = \left\lceil \frac{\rho L\left(\frac{100}{Q} - 1\right)}{B} \right\rceil,$$

where N represents the optimal number of data blocks, p is the disk transfer rate of the data storage device, L is the disk latency of the data storage device, Q represents the desired maximum percentage of total time consumed by disk latency, and B is the size of each data block;

wherein the one or more programs include a merge program and a forecasting program;

the merge program is operable to compare data record keys in a first set of floating buffers to generate the single sorted output; and the forecasting program is operable to copy additional data blocks from the data storage device into a second set of floating buffers before the additional data blocks are used by the merge program and to replace depleted floating buffers from the first set with floating buffers from the second set.

11. The data sorting system of claim 10, wherein the optimal number of data blocks is the number needed to achieve a desired reduction in disk latency costs.

* * * * *

UNITED STATES PATENT AND TRADEMARK OFFICE
CERTIFICATE OF CORRECTION

| | |
|---|---|
| PATENT NO. | : 7,454,420 B2 |
| APPLICATION NO. | : 10/983745 |
| DATED | : November 18, 2008 |
| INVENTOR(S) | : Ray et al. |

It is certified that error appears in the above-identified patent and that said Letters Patent is hereby corrected as shown below:

In column 12, line 43, delete "buffer," and insert -- buffer; --.

In column 13, line 30, delete "merge program".

In column 13, line 45, delete "9" and insert -- $\rho$ --.

Signed and Sealed this

Twenty-first Day of April, 2009

JOHN DOLL
*Acting Director of the United States Patent and Trademark Office*